United States Patent
Gibeau et al.

(10) Patent No.: US 12,097,755 B2
(45) Date of Patent: Sep. 24, 2024

(54) SIDE SILL PART FOR AN AUTOMOTIVE VEHICLE

(71) Applicant: ArcelorMittal, Luxembourg (LU)

(72) Inventors: Elie Gibeau, Pont Sainte Maxence (FR); Kevin Bardin, Chantilly (FR); Alexandre Sotty, Compiègne (FR); Nicolas Schneider, Saint-Martin Longueau (FR)

(73) Assignee: ARCELORMITTAL, Luxembourg (LU)

( * ) Notice: Subject to any disclaimer, the term of this patent is extended or adjusted under 35 U.S.C. 154(b) by 209 days.

(21) Appl. No.: 17/608,754

(22) PCT Filed: May 7, 2020

(86) PCT No.: PCT/IB2020/054341
§ 371 (c)(1),
(2) Date: Nov. 3, 2021

(87) PCT Pub. No.: WO2020/225766
PCT Pub. Date: Nov. 12, 2020

(65) Prior Publication Data
US 2022/0281304 A1 Sep. 8, 2022

(30) Foreign Application Priority Data
May 7, 2019 (WO) .................. PCT/IB2019/053732

(51) Int. Cl.
*B60K 1/04* (2019.01)
*B62D 21/15* (2006.01)
(Continued)

(52) U.S. Cl.
CPC .............. *B60K 1/04* (2013.01); *B62D 21/157* (2013.01); *B62D 25/025* (2013.01);
(Continued)

(58) Field of Classification Search
CPC .. B62D 21/157; B62D 25/025; B62D 27/023; B62D 29/007; B60K 1/04; B60K 2001/0438; B60Y 2306/01
See application file for complete search history.

(56) References Cited

U.S. PATENT DOCUMENTS 9,555,840 B2 * 1/2017 Belpaire ................. B62D 21/09
10,099,725 B2 * 10/2018 Ishii ..................... B62D 21/157
(Continued)

FOREIGN PATENT DOCUMENTS

CN 104340276 A 2/2015
CN 107074292 A 8/2017
(Continued)

OTHER PUBLICATIONS

Search Report for PCT/IB2020/054341.
Search Report for PCT/IB2019/053732.

*Primary Examiner* — James A Shriver, II
*Assistant Examiner* — Michael T. Walsh
(74) *Attorney, Agent, or Firm* — Davidson Kappel LLC

(57) ABSTRACT

A side sill part (6) for an automotive vehicle comprises an outer sill member (10) and an inner sill member (12), and defining between them an outer volume (47). The side sill part also includes an external profile part (68), defining with the inner sill member (12) an inner volume (74), and a first profile part (48) extending in the outer volume (47). The first profile part comprising at least one outer contact portion (50), at least one inner contact portion (52), and at least one joining wall (54) joining the outer contact portion (50) and the inner contact portion (52). The side sill part further includes a second profile part (88) extending in the inner volume (74), comprising at least one outer contact portion (90), at least one inner contact portion (92), and at least one
(Continued)

joining wall (94) joining the outer contact portion (90) and the inner contact portion (92).

<center>28 Claims, 5 Drawing Sheets</center>

(51) Int. Cl.
    *B62D 25/02*     (2006.01)
    *B62D 27/02*     (2006.01)
    *B62D 29/00*     (2006.01)

(52) U.S. Cl.
    CPC .......... *B62D 27/023* (2013.01); *B62D 29/007* (2013.01); *B60K 2001/0438* (2013.01)

(56) References Cited

<center>U.S. PATENT DOCUMENTS</center>

| | | | |
|---|---|---|---|
| 10,494,034 B2* | 12/2019 | Makowski | H01M 50/249 |
| 11,572,103 B2* | 2/2023 | Limousin | B62D 29/007 |
| 2012/0299334 A1 | 11/2012 | Takayama et al. | |
| 2013/0009424 A1* | 1/2013 | Herntier | B62D 21/157 |
| | | | 296/203.03 |
| 2015/0042125 A1 | 2/2015 | Bruggemann et al. | |
| 2016/0229456 A1* | 8/2016 | Boettcher | B62D 27/026 |
| 2017/0247071 A1 | 8/2017 | Schneider et al. | |
| 2017/0297631 A1 | 10/2017 | Schneider et al. | |
| 2017/0327155 A1 | 11/2017 | Boettcher et al. | |
| 2018/0237075 A1* | 8/2018 | Kawabe | B60L 50/66 |
| 2018/0370577 A1 | 12/2018 | Takahashi | |
| 2020/0114973 A1* | 4/2020 | Takahashi | B62D 25/2036 |

<center>FOREIGN PATENT DOCUMENTS</center>

| | | | | |
|---|---|---|---|---|
| CN | 109094663 A | | 12/2018 | |
| DE | 4326175 A1 | | 2/1994 | |
| DE | 102011051622 A1 | | 1/2013 | |
| DE | 102014113403 A1 | * | 3/2016 | |
| EP | 0764493 A1 | | 3/1997 | |
| EP | 2298628 A1 | * | 3/2011 | |
| FR | 3010379 A1 | * | 3/2015 | ........... B62D 25/025 |
| FR | 3053654 A1 | * | 1/2018 | ............. B62D 21/15 |
| FR | 3117987 A1 | * | 6/2022 | |
| GB | 2306922 A | * | 5/1997 | .......... B62D 21/157 |
| JP | 2018193003 A | | 12/2018 | |
| WO | WO2011118107 A1 | | 9/2011 | |
| WO | WO2016046592 A1 | | 3/2016 | |
| WO | WO2016146694 A1 | | 9/2016 | |

* cited by examiner

SIDE SILL PART FOR AN AUTOMOTIVE VEHICLE

The present disclosure relates to a side sill part for an automotive vehicle.

The present disclosure also relates to a vehicle underbody structure comprising such a side sill part and to a method for producing such a side sill part.

BACKGROUND

In a vehicle, the vehicle underbody structure comprises two side sill parts, also called lower side sills, which are external parts of the vehicle extending along a longitudinal direction of the vehicle on either sides of the floor of the vehicle under the doors of the vehicle. The side sill parts are arranged on either side of one or more transversal beams acting as reinforcing elements of the vehicle underbody structure.

In case of a side impact against the vehicle, the transversal beams are arranged to prevent the deformation of the vehicle compartment to maintain the integrity of the floor panel, thereby protecting the occupants of the vehicle by limiting intrusions of any kind in the vehicle passenger compartment.

A side impact is described in various standardized crash tests such as for example the European New Car Assessment Program (EuroNCAP) Pole Side Impact, in which the vehicle is impacted on its side by a fixed pole having a relative initial velocity at the time of impact of 32 km/h. Another standardized side impact test is the EuroNCAP Advanced European Mobile Deformable Barrier (AE-MDB) Side Impact, in which the vehicle is impacted on its side by a 1300 kg standardized barrier spanning part of the length of the vehicle and travelling at a speed of 50 km/h.

In case of such a side impact, the side sill part can be arranged to be crushed against the transversal beams to absorb part of the energy of the impact, while the transversal beams remain undeformed to prevent intrusion in the vehicle compartment.

In order to do so, the side sill part is for example formed by a hollow tubular part, which can be crushed during a side impact. In order to improve the energy absorption, one or more profile parts can be placed inside the inner volume of the side sill part, the profile parts being arranged to be crushed during the side impact in order to dissipate energy.

SUMMARY

However, in some vehicles, in particular electric vehicles having a battery pack extending under the vehicle floor, the energy absorption must be greatly improved in order to prevent the battery pack to be damaged during the side impact. This need if further increased by the increased weight of the vehicle, due to the presence of the battery pack and its protecting frame. Indeed, the increased weight causes an increase in the kinetic energy of the vehicle, which, in turn, increases the energy absorption needs in case of impacts.

One of the aims of the present disclosure is to provide a side sill part optimized in terms of energy absorption in case of a side impact.

To this end, a side sill part for an automotive vehicle is provided extending along a substantially longitudinal direction, comprising at least:

an outer sill member and an inner sill member, made of a substantially rigid material, and defining between them an outer volume, the outer sill member comprising at least one inner contact surface and the inner sill member comprising at least one outer contact surface, at least a part of the outer contact surface of the inner sill member being spaced from at least a part of the inner contact surface of the outer sill member according to a transversal direction substantially perpendicular to the longitudinal direction;

an external profile part, defining with the inner sill member an inner volume, the external profile part comprising an outer contact surface at least in part spaced from an inner contact surface of the inner sill member according to the transversal direction;

a first profile part extending in the outer volume, the first profile part comprising at least one outer contact portion, applied against the inner contact surface of the outer sill member, at least one inner contact portion, extending opposite the outer contact surface of the inner sill member, and at least one joining wall joining the outer contact portion and the inner contact portion along the transversal direction, the first profile part presenting a first crushability in the transversal direction, a second profile part extending in the inner volume, the second profile part comprising at least one outer contact portion, applied against the inner contact surface of the inner sill member, at least one inner contact portion, extending opposite the outer contact surface of the external profile part, and at least one joining wall joining the outer contact portion and the inner contact portion along the transversal direction, the second profile part presenting a second crushability in the transversal direction inferior to the first crushability, wherein the external profile part presents a third crushability in the transversal direction inferior to the second crushability.

The side sill part according to the present disclosure comprises a first profile part having a higher crushability and extending between two substantially rigid members and a second profile part having a lower crushability and placed between a substantially rigid member and an external profile part having an even lower crushability. Such an arrangement allows precisely controlling the behavior of the side sill part during a side impact. More particularly, thanks to this arrangement, when a side impact occurs against the outer sill member, the outer sill member causes the first profile part to be crushed against the inner sill member, and, as the impact spreads towards the interior, the inner sill member then causes the second profile part to be crushed against the external profile part, which is then crushed against the rest of the vehicle underbody structure. This sequence of deformation optimizes the energy absorption by guarantying that the profile parts are all properly deformed, and therefore have absorbed a higher amount of energy, during the side impact.

According to other optional features of the side sill part, considered alone or according to any possible technical combination:

the first profile part comprises:
  at least one upper outer contact portion applied against the inner contact surface (16) of the outer sill member,
  at least one upper joining wall joining the upper outer contact portion to the inner contact portion,
  at least one lower outer contact portion applied against the inner contact surface (16) of the outer sill member, and at least one lower joining wall joining the lower outer contact portion to the inner contact portion;

the upper outer contact portion and the lower outer contact portion of the first profile part are attached to the inner contact surface of the outer sill member;

the second profile part comprises:
  at least one upper outer contact portion applied against the inner contact surface of the inner sill member,
  at least one upper inner contact portion extending opposite the outer contact surface of the external profile part,
  at least one upper joining wall joining the upper outer contact portion to the upper inner contact portion,
  at least one outer central contact portion applied against the inner contact surface of the inner sill member,
  at least one first intermediate joining wall joining the upper inner contact portion (98) to the outer central contact portion;
  at least one inner lower contact portion extending opposite the outer contact surface of the external profile part,
  at least one second intermediate joining wall joining the outer central contact portion to the inner lower contact portion,
  at least one lower outer contact portion applied against the inner contact surface of the inner sill member, and
  at least one lower joining wall joining the inner lower contact portion to the outer lower contact portion;

the upper outer contact portion and the lower outer contact portion of the second profile part are attached to the inner contact surface of the inner sill member;

the outer central contact portion of the second profile part is attached to the inner contact surface of the inner sill member;

the outer sill member comprises:
  at least one upper inner contact surface applied against the outer contact surface of the inner sill member,
  at least one central inner contact surface spaced from the outer contact surface of the inner sill member,
  at least one upper joining wall joining the upper inner contact surface to the central inner contact surface of the outer sill member,
  at least one lower inner contact surface applied against the outer contact surface of the inner sill member, and
  at least one lower joining wall joining the lower inner contact surface to the central inner contact surface of the outer sill member, wherein the outer volume is delimited by the central inner contact surface of the outer sill member, by the outer contact surface of the inner sill member and by the upper joining wall and the lower joining wall of the outer sill member;

the upper inner contact surface and the lower inner contact surface of the outer sill member are attached to the outer contact surface of the inner sill member;

the external profile part comprises:
  at least one upper outer contact surface applied against the inner contact surface of the inner sill member,
  at least one central outer contact surface spaced from the inner contact surface of the inner sill member,
  at least one upper joining wall joining the upper outer contact surface to the central outer contact surface of the external profile part,
  at least one lower outer contact surface applied against the inner contact surface of the inner sill member, and
  at least one lower joining wall joining the lower outer contact surface to the central outer contact surface of the external profile part, wherein the inner volume is delimited by the central outer contact surface of the external profile part, by the inner contact surface of the inner sill member and by the upper joining wall and the lower joining wall of the external profile part;

the upper outer contact surface and the lower outer contact surface of the external profile part are attached to the inner contact surface of the inner sill member;

the inner sill member comprises at least one central portion and one upper portion and one lower portion extending on either side of the central portion, the distance between the outer contact surface of the inner sill member in the central portion and the inner contact surface of the outer sill member being greater than the distance between the outer contact surface of the inner sill member in the upper and lower portions and the inner contact surface of the outer sill member;

the outer sill member and the inner sill member are made of a press-hardened steel part having a tensile strength greater than 1200 MPa;

the composition of the press-hardened steel comprises in % weight:
  $0.15\% \le C \le 0.5\%$, $0.5\% \le Mn \le 3\%$, $0.1\% \le Si \le 1\%$, $0.005\% \le Cr \le 1\%$, $Ti \le 0.2\%$, $Al \le 0.1\%$, $S \le 0.05\%$, $P \le 0.1\%$, $B \le 0.010\%$, the remainder being iron and unavoidable impurities resulting from the elaboration or
  $0.20\% \le C \le 0.25\%$, $1.1\% \le Mn \le 1.4\%$, $0.15\% \le Si \le 0.35\%$, $\le Cr \le 0.30\%$, $0.020\% \le Ti \le 0.060\%$, $0.020\% \le Al \le 0.060\%$, $S \le 0.005\%$, $P \le 0.025\%$, $0.002\% \le B \le 0.004\%$, the remainder being iron and unavoidable impurities resulting from the elaboration; or
  $0.24\% \le C \le 0.38\%$, $0.40\% \le Mn \le 3\%$, $0.10\% \le Si \le 0.70\%$, $0.015\% \le Al \le 0.070\%$, $Cr \le 2\%$, $0.25\% \le Ni \le 2\%$, $0.015\% \le Ti \le 0.10\%$, $Nb \le 0.060\%$, $0.0005\% \le B \le 0.0040\%$, $0.003\% \le N \le 0.010\%$, $S \le 0.005\%$, $P \le 0.025\%$, %, the remainder being iron and unavoidable impurities resulting from the elaboration;

the thickness of the outer sill member is substantially comprised between 1.2 mm and 1.6 mm;

the thickness of the inner sill member is substantially comprised between 0.8 mm and 1.2 mm;

the external profile part, the first profile part and the second profile part are made of a fully martensitic steel having a yield strength comprised between 1200 MPa and 1700 MPa and a tensile strength comprised between 1500 MPa and 1900 MPa;

the composition of the fully martensitic steel comprises in % weight:
  $0.15\% \le C \le 0.5\%$;

the product of the yield strength by the thickness of the external profile part is greater than the product of the yield strength by the thickness of the second profile part, the product of the yield strength by the thickness of the second profile part being greater than the product of the yield strength by the thickness of the first profile part;

the thickness of the external profile part is greater than the thickness of the second profile part, the thickness of the second profile part being greater than the thickness of the first profile part;

The thickness of the first profile part is substantially comprised between 0.8 mm and 1.2 mm;

the thickness of the second profile part is substantially comprised between 1.2 mm and 1.6 mm;

the thickness of the external profile part is substantially comprised between 1.6 mm and 2 mm;

at least one of the joining walls of the first profile part and/or of the second profile part extends in at least two different planes.

According to another aspect, the present disclosure relates to a vehicle underbody structure for an automotive vehicle comprising at least one transversal beam made of a substantially rigid material, extending in a transversal direction between two side sill parts as described above, a part of an inner contact surface of the external profile part of one of the side sill parts being applied against one of the transversal ends of the transversal beam and a part of the inner contact surface of the external profile part of the other side sill part being applied against the other transversal end of the transversal beam.

According to other optional features of the vehicle underbody structure, considered alone or according to any possible technical combination:

the vehicle underbody structure further comprises at least one battery pack protecting frame extending below the transversal beam between the two side sill parts, said protecting frame comprising at least two longitudinal reinforcing profiles, one of said reinforcing profiles extending opposite a part of the inner contact surface of the external profile part of one of the side sill parts and the other reinforcing profile extending opposite a part of the inner contact surface of the external profile part of the other side sill part;

each of the reinforcing profile is attached to the external profile part of the corresponding side sill part via a connecting part extending between said reinforcing profile and said external profile part of the corresponding side sill part;

each of the reinforcing profile is made of at least one roll formed steel sheet comprising an upper portion and a lower portion extending in the longitudinal direction, said upper portion and said lower portion each having a closed cross-section defined by a front wall, a rear wall, an upper wall and a lower wall, the upper wall and the lower wall joining the front wall to the rear wall, wherein a central wall extending between the front walls and the rear walls of the upper portion and of the lower portion forms both the lower wall of the upper portion and the upper wall of the lower portion; and at least one battery cell for an electrical vehicle is received in the battery pack protecting frame.

According to another aspect, the present disclosure relates to a method for producing a side sill part as described above, comprising at least the following steps:

providing an outer sill member and an inner sill member made of a substantially rigid material, providing a first profile part, a second profile part and an external profile part, the first profile part presenting a first crushability in the transversal direction greater than a second crushability of the second profile part in the transversal direction, the second crushability being greater than a third crushability of the external profile part in the transversal direction, assembling the outer sill member, the inner sill member, the first profile part, the second profile part and the external profile part such that the outer sill member and the inner sill member define an outer volume, the first profile part extending in the outer volume and such that the inner sill member and the external profile part define an inner volume, the second profile part extending in the inner volume.

According to other optional features of the method, considered alone or according to any possible technical combination:

the outer sill member and the inner sill member are each obtained by hot stamping a tailor welded steel blank;

the first profile part, the second profile part and the external profile part are each obtained by roll forming a steel sheet or a steel coil;

the assembling step comprises the following steps:
attaching the first profile part to the outer sill member,
attaching the second profile part to the inner sill member,
attaching the external profile part to the inner sill member, to which the second profile part is attached,
attaching the outer sill member, to which the first profile part is attached, to the inner sill member, to which the second profile part (88) and the external profile part are attached; and the attaching steps are spot welding steps.

BRIEF SUMMARY OF THE DRAWINGS

Other aspects and advantages of the present disclosure will appear upon reading the following description, provided by way of example and made in reference to the appended drawings, wherein.

DETAILED DESCRIPTION

In the description, the term "longitudinal" is defined according to the rear-front direction of an automotive vehicle, corresponding to the length of the vehicle, the term "transversal" is defined according to the left-right direction of an automotive vehicle, corresponding to the width of the vehicle, and the term "elevation" is defined according to the height of an automotive vehicle. The terms "upper" and "lower" are defined relative to the elevation direction. The term "inner" is defined relative to what is turned towards the interior of the vehicle and the term "outer" is defined relative to what is turned towards the exterior of the vehicle.

Figure 1:
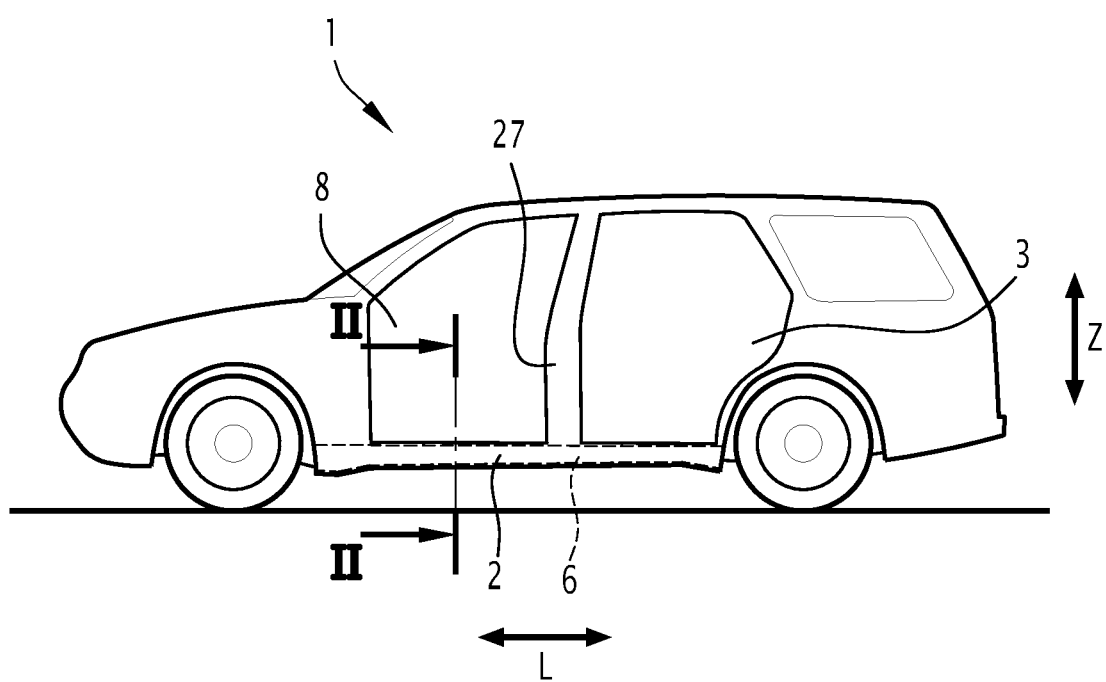
FIG. 1 is a side view of an automotive vehicle comprising a side sill part.
Figure 2:
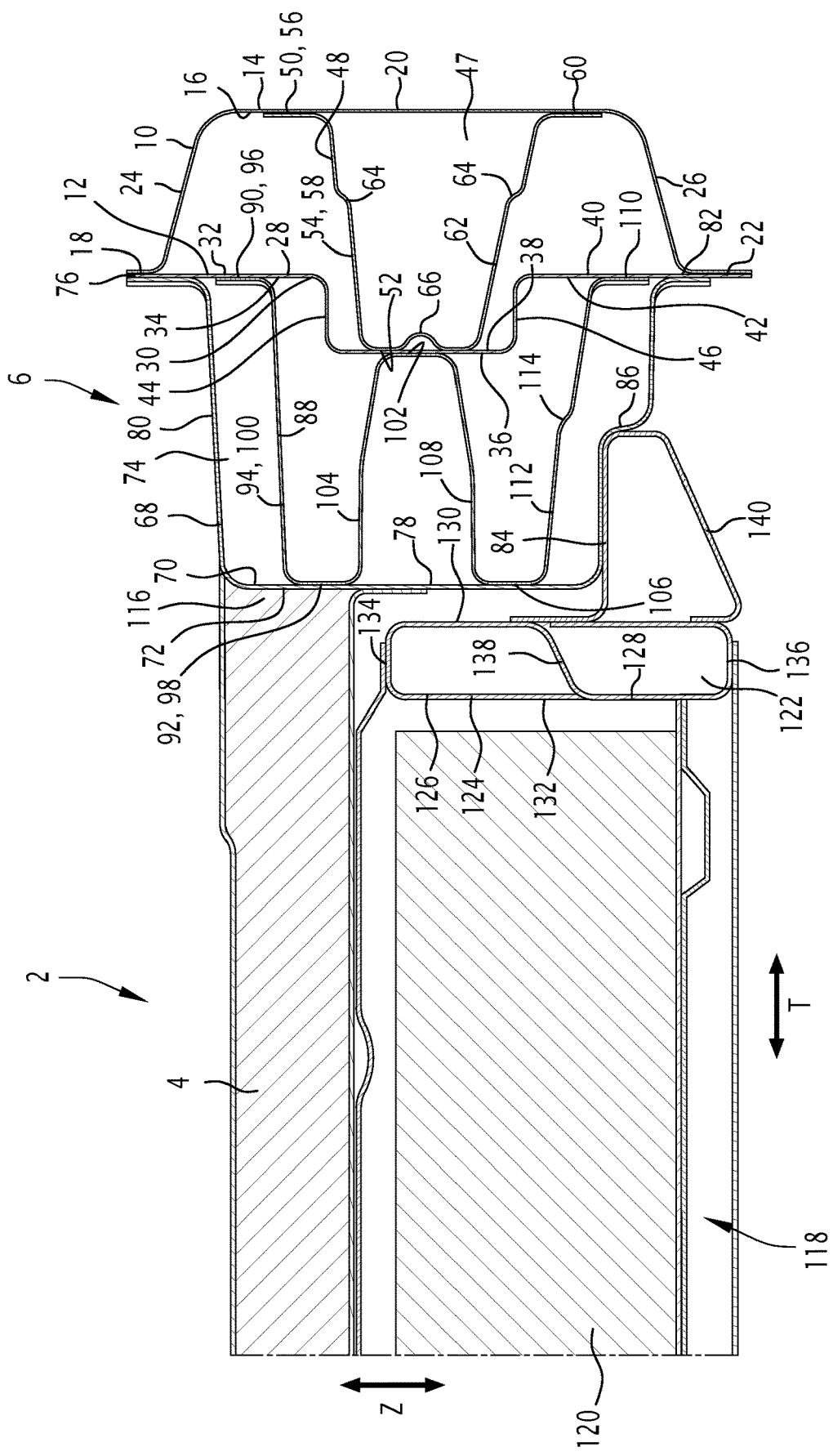
FIG. 2 is a transversal cross-section view according to axis II-II of FIG. 1 of a part of a vehicle underbody structure comprising a side sill part according to the present disclosure.

With reference to FIGS. 1 and 2, an automotive vehicle 1, and more particularly a vehicle underbody structure 2, extending under the floor of the vehicle, are described.

The vehicle underbody structure 2 comprises at least one transversal beam 4 extending along a transversal direction T between two side sill parts 6 extending along a longitudinal direction L. As shown in FIG. 1, the side sill parts 6 form an external part extending under the door(s) 8 on each side of the vehicle. The transversal beam 4 extends in the floor of the vehicle under the vehicle compartment, along a transversal direction T, and form for example a support for attaching at least one vehicle seat in the vehicle compartment. As will be described in greater details subsequently, in case of a side impact, the side sill part 6 on which the impact occurs is arranged to be crushed and to absorb energy while the transversal beam 4 is arranged to remain substantially undeformed to prevent intrusion in the vehicle compartment.

The side sill parts 6 are substantially identical and symmetrical one relative to the other relative to a central plane of the vehicle extending in the longitudinal and elevation directions. Consequently, in reference to FIGS. 2 and 3, only one of the side sill part 6, more particularly the side sill part extending on the right side of the vehicle, will now be described in detail.

The side sill part 6 comprises an outer sill member 10 and an inner sill member 12, each made of a substantially rigid material and extending along the longitudinal direction L. By rigid material, it is meant a material having a high mechanical resistance requiring an important energy to be deformed. Such a rigid material has for example a tensile strength greater than 1200 MPa. According to one embodiment, the outer sill member 10 and the inner sill member 12 are each made of a press-hardened steel part having a tensile strength greater than 1200 MPa. More particularly, according to various embodiments, the composition of the press-hardened steel comprises in % weight:

$0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration or $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration;

or $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, %, the remainder being iron and unavoidable impurities resulting from the elaboration.

The press-hardened steel is for example Usibor® 1500. The outer sill member 10 and the inner sill member 12 are for example obtained by hot stamping a tailor welded steel blank.

The outer sill member 10 comprises an outer contact surface 14, turned towards the exterior of the vehicle, and an inner contact surface 16, turned towards the interior of the vehicle and toward the inner sill member 12. The outer contact surface 14 and the inner contact surface 16 form opposite faces of the outer sill member 10. The thickness of the outer sill member 10, defined as the distance separating the outer contact surface 14 and the inner contact surface 16, is for example substantially comprised between 1.2 mm and 1.6 mm, and is for example substantially equal to 1.4 mm.

Figure 3:
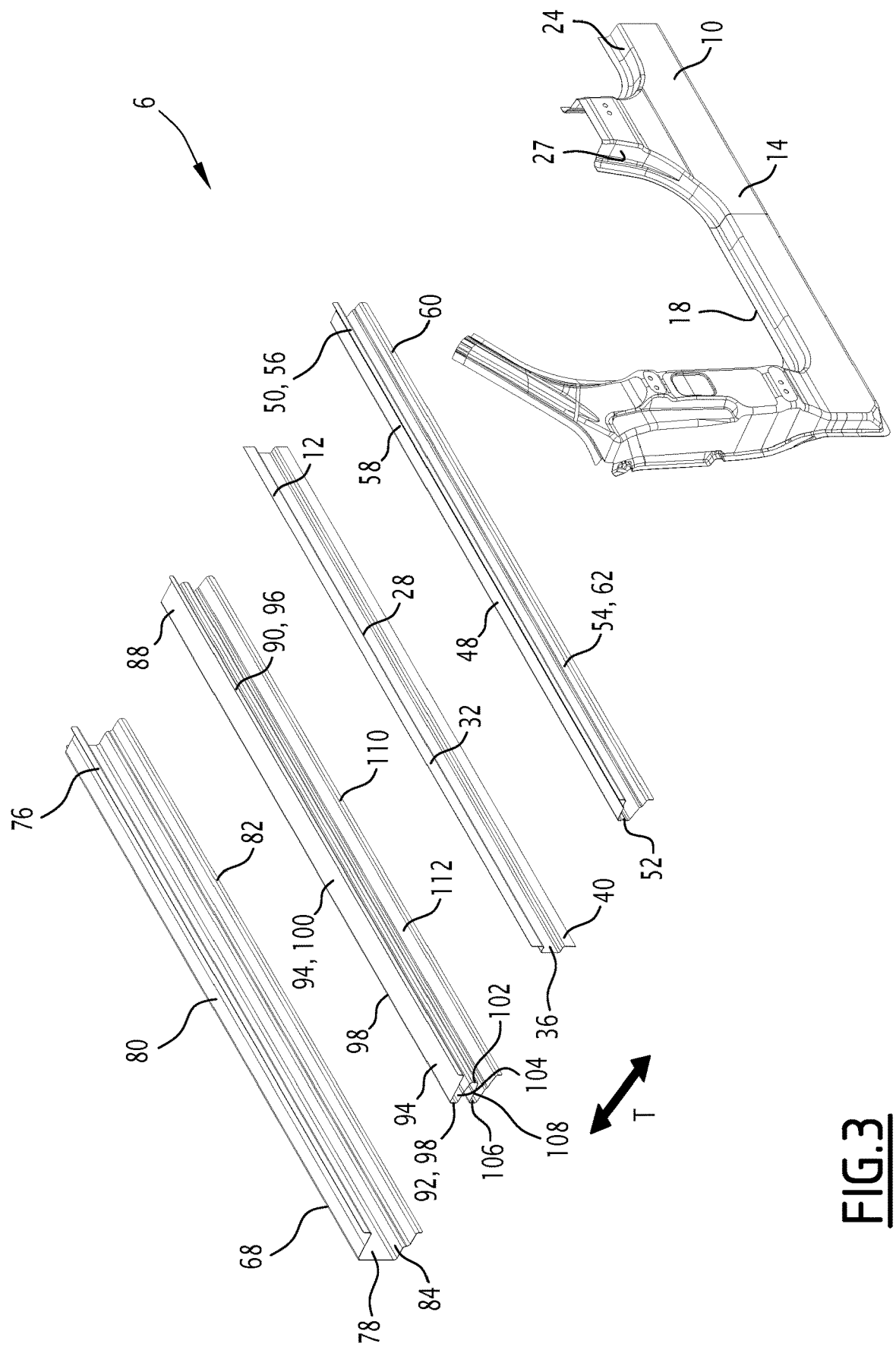
FIG. 3 is an exploded perspective view of the side sill part according to the present disclosure.

According to the embodiment shown in FIGS. 2 and 3, the outer sill member 10 has a cross-section having a hat shape and comprises an upper portion, defining an upper inner contact surface 18, a central portion, defining a central inner contact surface 20, and a lower portion, defining a lower inner contact surface 22. The upper portion and the lower portion are joined to the central portion, respectively by an upper joining wall 24 and by a lower joining wall 26. The central portion protrudes relative to the upper and lower portions towards the exterior, meaning that the distance separating the central portion from the inner sill member 12 is greater than the distance separating the upper and lower portions from the inner sill member 12. As will be described subsequently, the upper inner contact surface 18 and the lower inner contact surface 22 of the outer sill member 10 are applied against and attached to the inner sill member 12 while the central inner surface 20 is spaced from the inner sill member 12 according the transversal direction T.

According to an embodiment, a recess extends in the central portion of the inner sill-member 10 toward the interior of the vehicle.

As shown in FIG. 3, the outer sill member 10 is for example part of an outer door ring member 27 comprising at least the outer sill member 10 and an outer A-pillar member and an outer B-pillar member, the outer A-pillar and B-pillar members extending according to the elevation direction Z. As known per se, the A-pillar and B-pillar extend on either side of a front door 8 of the vehicle, the A-pillar extending from the outer sill member 10 to the windshield and the B-pillar extending from the outer sill member 10 to the roof of the vehicle, as shown in FIG. 1.

The inner sill member 12 comprises an outer contact surface 28, turned towards the exterior of the vehicle and towards the outer sill member 10, and an inner contact surface 30, turned towards the interior of the vehicle. The outer contact surface 28 and the inner contact surface 30 form opposite faces of the inner sill member 12. The thickness of the inner sill member 12, defined as the distance separating the outer contact surface 28 and the inner contact surface 30, is for example substantially comprised between 0.8 mm and 1.2 mm, and is for example substantially equal to 1 mm. More generally, the thickness of the inner sill member 12 is inferior to the thickness of the outer sill member 10, which makes the inner sill member 12 more deformable, or crushable, in the transversal direction T than the outer sill member 10.

By "more deformable or crushable in the transversal direction T", it is meant that less energy is required to deform or crush a part compared to another one. By crushable, it is meant the ability of a part to fold on itself when a force is applied on one of its contact surface. When a part is crushed under the influence of a force, the part folds onto itself much in the same way as a plastic bottle does when a compressive load is applied between the top and the bottom of the bottle. To this end, a crushability of a part is defined by the necessary amount of energy or by the necessary amount of force required to crush this part, the crushability being greater as the necessary amount of energy or the necessary force is reduced.

As a variant, when the outer sill member 10 and the inner sill member 12 are made of different materials, the crushability in the transversal direction T of the inner sill member 12 is greater than the crushability in the transversal direction T of the outer sill member 10 by making the product of the yield strength by the thickness of the inner sill member 12 greater than the product of the yield strength by the thickness of the outer sill member 10.

According to an embodiment, the inner sill member 12 is a substantially flat member. However, according to a preferable embodiment shown in FIGS. 2 and 3, the inner sill member 12 has a cross-section having a hat shape and comprises an upper portion, defining an upper outer contact surface 32 and an upper inner contact surface 34, a central portion, defining a central outer contact surface 36 and a central inner contact surface 38, and a lower portion, defining a lower outer contact surface 40 and a lower inner contact surface 42. The upper portion and the lower portion are joined to the central portion, respectively by an upper joining wall 44 and by a lower joining wall 46. The central portion protrudes relative to the upper and lower portions towards the interior, meaning that the distance separating the central portion from outer seal member 10 is greater than the distance separating the upper and lower portions from the outer seal member 10.

The upper inner contact surface 18 of the outer sill member 10 is applied against and attached to the upper outer contact surface 32 of the inner sill member 12 and the lower inner contact surface 22 of the outer sill member 10 is applied against and attached to the lower outer contact surface 40 of the inner sill member 12. The attachment of the outer sill member 10 to the inner sill member 12 is for example obtained by spot welding steps.

According to an embodiment, the height of the central portion of the inner sill member 12, measured according to the elevation direction, is inferior to the height of the central portion of the outer sill member 10.

The inner sill member 12 is for example part of an inner door ring member comprising at least the inner sill member 12 and an inner A-pillar member and an inner B-pillar member. The inner door ring member and the outer door ring member 27 are attached together to form a door ring of the vehicle comprising the A-pillar and the B-pillar.

The outer sill member 10 and the inner sill member 12 define between them an outer volume 47 delimited by the inner contact surface 16 of the outer sill member 10, by the outer contact surface 28 of the inner sill member 12 and by the joining walls 24 and 26 of the outer sill member 10. The largest width of the outer volume 47, measured in the transversal direction T and corresponding to the distance separating the central inner contact surface 20 of the outer sill member 10 from the central outer contact surface 36 of the inner sill member, is for example comprised between 70 mm and 110 mm.

A first profile part 48 extends according to the longitudinal direction L inside the outer volume 47 between the inner contact surface 16 of the outer sill member 10 and the outer contact surface 28 of the inner sill member 12.

The first profile part 48 comprises an outer contact portion 50 applied against the inner contact surface 16 of the outer sill member 10, and an inner contact portion 52 extending opposite, and in the vicinity of, the outer contact surface 28 of the inner sill member 12. At least one joining wall 54 joins the outer contact portion 50 to the inner contact portion 52.

By "opposite and in the vicinity of", it is meant that the distance separating the inner contact portion 52 of the first profile part 48 from the outer contact surface 28 of the inner sill member 12 is comprised between 0 mm and 5 mm. It should be noted that this space is provided to take into account manufacturing tolerances and that the inner contact portion 52 of the first profile part 48 could be in contact with the outer contact surface 28 of the inner sill member 12. Consequently, the joining wall 54 extends through almost the entire outer volume 47 in the transversal direction T.

The first profile part 48 comprises an outer contact surface and an inner contact surface forming opposite faces of the first profile part 48, the outer contact surface being applied against the inner contact surface 16 of the outer sill member 10 in the outer contact portion 50 and the inner contact surface extending opposite the outer contact surface 28 of the inner sill member 12 in the inner contact portion 52.

According to the embodiment shown in FIGS. 1 and 2, the first profile part 48 has a hat shaped cross section and comprises:
  an upper outer contact portion 56, wherein the outer contact surface of the first profile part 48 is applied against the inner contact surface 16 of the outer sill member 10, more particularly against the central inner contact surface 20 of the outer sill member 10,
  an upper joining wall 58 joining the upper outer contact portion 56 to the inner contact portion 52,
  an lower outer contact portion 60, wherein the contact outer surface of the first profile part 48 is applied against the inner contact surface 16 of the outer sill member 10, more particularly against the central inner contact surface 20 of the outer sill member 10,
  a lower joining wall 62 joining the lower outer contact portion 60 to the inner contact portion 52.

The inner contact portion 52 of the first profile part 48 extends opposite, and in the vicinity of, the central outer contact surface 36 of the inner sill member 12.

According to an embodiment, the upper contact portion 56 is attached to the inner contact surface 16 of the outer sill member 10 and the lower contact portion 60 is attached to the inner contact surface 16 of the outer sill member 10. For example, the upper contact portion 56 and the lower contact portion 60 of the first profile part 48 are attached to the inner contact surface 16 of the outer sill member 10 on either side of the recess, as shown in FIG. 2. The attachment is realized for example by spot welding.

The upper and lower joining walls 58, 62 extend on either side of the inner contact portion 52 according to the elevation direction. According to an embodiment, the upper and lower joining walls 58, 62 diverge from one another from the inner contact portion 52 to the upper and lower contact portions 56, 60, meaning that these upper and lower joining walls 58, 60 form an non-zero angle with the transversal direction T.

According to an embodiment, the upper joining wall 58 and/or the lower joining wall 62 extend in at least two different planes, meaning that a step 64 is formed in the upper joining wall 58 and/or the lower joining wall 62. The step(s) 64 is (are) arranged such that the upper joining wall 58 and/or the lower joining wall 62 each extend in two different planes each extending substantially along the transversal direction T, the two planes extending at different heights in an elevation direction Z According to an embodiment, the inner contact portion 52 comprises a recess 66 extending toward the inner central contact surface 20 of the outer sill member 10, meaning that the inner contact portion 52 of the first profile part 48 extends closer to the central outer contact surface 36 of the inner sill member 12 around the recess 66 than in the recess 66.

The side sill part 6 further comprises an external profile part 68 extending in the longitudinal direction L between the inner sill member 12 and the transversal beam 4.

The external profile part 68 comprises an inner contact surface 70 and an outer contact surface 72 forming opposite faces of the external profile part 68. The outer contact surface 68 is at least in part spaced from the inner contact surface 30 of the inner sill member 12 in order to define an inner volume 74 between the external profile part 68 and the inner sill member 12.

According to the embodiment shown in FIGS. 2 and 3, the external profile part 68 also has a hat shape cross-section and comprises:
  an upper portion, wherein an upper outer contact surface 76 is applied against the inner contact surface 30 of the inner sill member 12, and more particularly against the upper inner contact surface 34 of the inner sill member 12, a central portion, wherein a central outer contact surface 78 is spaced from the inner contact surface 30 of the inner sill member 12, an upper joining wall 80 joining the upper outer contact surface 76 to the central outer contact surface 78, a lower portion, wherein a lower outer contact surface 82 is applied against the inner contact surface 30 of the inner sill member 12, and more particularly against the lower inner contact surface 42 of the inner sill member 12, a lower joining wall 84 joining the lower outer contact surface 82 to the central outer contact surface 78.

According to an embodiment, the upper portion of the external profile part 68 is attached to the upper inner contact surface 34 of the inner sill member 12 and the lower portion of the external profile part 68 is attached to the lower inner contact surface 42 of the inner sill member 12. The attachment between the upper portion of the inner sill member 12 with the upper portion of the outer sill member 10 and with the upper portion of the external profile part 68 is for example obtained by spot welding these three layers together. Likewise, the attachment between the lower portion of the inner sill member 12 with the lower portion of the outer sill member 10 and with the lower portion of the external profile part 68 is for example obtained by spot welding these three layers together.

The upper joining wall 80 and the lower joining wall 84 extend substantially according to the transversal direction T.

According to an embodiment, the lower joining wall 84 of the external profile part 68 comprises a step 86 separating a portion of the lower joining wall 84 adjacent to the central portion and a portion of the lower joining wall 84 adjacent to the lower portion of the external profile part 68 and arranged such that the lower joining wall 84 extends in two planes, each extending substantially in the transversal direction T and each extending at different height according to the elevation direction Z. The function of the step 86 and of the portion of the lower joining wall 84 adjacent to the central portion will be described subsequently.

According to the embodiment shown in FIGS. 2 and 3, the height of the central portion of the external profile part 68 is greater than the height of the central portion of the inner sill member 12, and is substantially equal or slightly greater than the height of the central portion of the outer sill member 10.

The inner volume 74 is delimited by the inner contact surface 30 of the inner sill member 12, by the outer contact surface 72 of the external profile part 68 and by the joining walls 80 and 84 of the external profile part 68. The width of the inner volume 74, measured in the transversal direction T and corresponding to the distance separating the central inner contact surface 38 of the inner sill member 12 from the central outer contact surface 78 of the external profile part 68 is for example comprised between 70 mm and 110 mm.

Consequently, the width of the outer volume 47 represents between 40% and 60% of the total width of the side sill part 6 in the transversal direction T, which is around 180 mm, the width of the inner volume 74 representing the remainder of this total width.

A second profile part 88 extends according to the longitudinal direction L inside the inner volume 74 between the inner contact surface 30 of the inner sill member 12 and the outer contact surface 72 of the external profile part 68.

The second profile part 88 comprises an outer contact portion 90 applied against the inner contact surface 30 of the inner sill member 12, and an inner contact portion 92 extending opposite, and in the vicinity of, the outer contact surface 72 of the external profile part 68. At least one joining wall 94 joins the outer contact portion 90 to the inner contact portion 92.

By "opposite and in the vicinity of", it is meant that the distance separating the inner contact portion 92 of the second profile part 88 from the outer contact surface 72 of the external profile part 68 is substantially comprised between 0 mm and 0.5 mm. It should be noted that this space is provided to take into account manufacturing tolerances and that the inner contact portion 92 of the second profile part 88 could be in contact with the outer contact surface 72 of the external profile part 68. Consequently, the joining wall 94 extends through almost the entire inner volume 74 in the transversal direction T.

The second profile part 88 comprises an outer contact surface and an inner contact surface forming opposite faces of the second profile part 88, the outer contact surface being applied against the inner contact surface 30 of the inner sill member 12 in the outer contact portion 90 and the inner contact surface extending opposite the outer contact surface 72 of the external profile part 68 in the inner contact portion 92.

According to the embodiment shown in FIGS. 1 and 2, the second profile part 88 has a W shaped cross section and comprises:

an upper outer contact portion 96, wherein the outer contact surface is applied against the inner contact surface 30 of the inner sill member 12, and more particularly against the upper inner contact surface 34 of the inner sill member 12, an upper inner contact portion 98, wherein the inner contact surface extends opposite the outer contact surface 70 of the external profile part 68, and more particularly opposite the outer central contact surface 78 of the external profile part 68, an upper joining wall 100 joining the upper outer contact portion 96 to the upper inner contact portion 98, a central outer contact portion 102 applied against the inner contact surface 30 of the inner sill member 12, and more particularly against the central inner contact surface 38 of the inner sill member 12, a first intermediate joining wall 104 joining the upper inner contact portion 98 to the central outer contact portion 102, a lower inner contact portion 106 extending opposite the outer contact surface 70 of the external profile part 68, and more particularly opposite the central outer contact surface 78 of the external profile part 68, a second intermediate joining wall 108 joining the central outer contact portion 102 to the lower inner contact portion 106, a lower outer contact portion 110 applied against the inner contact surface 30 of the inner sill member 12, and more particularly against the lower inner contact surface 42 of the inner sill member 12 a lower joining wall 112 joining the lower inner contact portion 106 to the lower outer contact portion 110.

According to an embodiment, the upper outer contact portion 96 is attached to the inner contact surface 30 of the inner sill member 12 and the lower outer contact portion 110 is attached to the inner contact surface 30 of the inner sill member 12. According to an embodiment, the central outer contact portion 102 is also attached to the inner contact surface 30 of the inner sill member 12.

The upper joining wall 100 extends in the space separating the central outer contact surface 78 of the external profile part 68 from the upper inner contact surface 34 of the inner sill member 12 substantially along the transversal direction T and the lower joining wall 112 extends in the space separating the central outer contact surface 78 of the external profile part 68 from the lower inner contact surface 42 of the inner sill member 12 substantially along the transversal direction T. The first and second intermediate joining walls 104 and 108 both extend in the space separating the central outer contact surface 78 of the external profile part 68 from the central inner contact surface 38 of the inner sill member 12 substantially along the transversal direction T. In other words, the width of the first and second intermediate joining walls 104 and 108, measured in the transversal direction, is inferior to the width of the upper and lower joining walls 100 and 112.

According to an embodiment, at least one of the upper and lower joining walls 100 and 112 extends in at least two planes, meaning that a step 114 is formed in the upper joining wall 100 and/or the lower joining wall 112. The step(s) 114 is (are) arranged such that the upper joining wall 100 and/or the lower joining wall 112 each extend in two different planes each extending substantially along the transversal direction T, the two planes extending at different heights in an elevation direction Z The first profile part 48 has a first crushability in the transversal direction T, the second profile part 88 has a second crushability in the transversal direction T and the external profile part 68 has a third crushability in the transversal direction T. The first profile part 48, the second profile part 88 and the external profile part 68 are arranged such that the first crushability is greater than the second crushability, which is greater than the third crushability. In other words, less energy is required to crush the first profile part 48 than the second profile part 88, which requires less energy to be crushed than the external profile part 68 in the transversal direction T. Furthermore, the first, second and third crushabilities are all greater than the crushability of the outer sill member 10 and than the crushability of the inner sill member 12 in the transversal direction T.

According to an embodiment, the first, second and external profile parts 48, 88 and 68 are all made of the same material, which is a fully martensitic steel having a yield strength comprised between 1200 MPa and 1700 MPa and a tensile strength comprised between 1500 MPa and 1900 MPa. According to an embodiment, the composition of the fully martensitic steel comprises in % weight: 0.15%≤C≤0.5%. Such a fully martensitic steel is for example MartINsite® 1500 or MartINsite® 1700. Such a martensitic steel is a good compromise between easy shaping process by profiling, mechanical performances and weight reduction. The material may be uncoated or coated, for example galvannealed or galvanized by any suitable process such as hot dip coating, electrodeposition, vacuum coating. The first, second and external profile parts 48, 88 and 68 are for example each obtained by roll forming a steel sheet or a steel coil.

According to this embodiment, the difference between the crushabilities of the first, second and external profile parts 48, 88 and 68 in the transversal direction T is obtained by varying the thicknesses of these profile parts. The thickness of a profile part is defined by the distance separating its outer contact surface from its inner contact surface. In order to obtain a second crushability which is inferior to the first crushability and a third crushability which is inferior to the second crushability, the thickness of the external profile part 68 is greater than the thickness of the second profile part 88 and the thickness of the second profile part 88 is greater than the thickness of the first profile part 48.

According to an embodiment, the thickness of the first profile part 48 is substantially comprised between 0.8 mm and 1.2 mm, and is for example equal to 1 mm. According to an embodiment, the thickness of the second profile part 88 is substantially comprised between 1.2 mm and 1.6 mm, and is for example equal to 1.4 mm. According to an embodiment, the thickness of the external profile part 68 is substantially comprised between 1.6 mm and 2 mm, and is for example equal to 1.8 mm.

As a variant, when the first profile part 48, the second profile part 88 and the external profile part 68 are made of different materials, the first, second and third crushabilities in the transversal direction T are obtained by making the product of the yield strength by the thickness of the external profile part 68 greater than the product of the yield strength by the thickness of the second profile part 88 and by making the product of the yield strength by the thickness of the second profile part 88 greater than the product of the yield strength by the thickness of the first profile part 48.

According to an embodiment, the side sill part 6 further comprises a cover part extending towards the exterior over the outer sill part 10 and concealing the rest of the side sill part 6 from the exterior. In other words, the cover part forms the visible part of the side sill part 6 when the side sill part 6 is mounted on the vehicle. The cover part has an aesthetic function and not a structural function and can therefore be chosen to confer a satisfactory appearance to the side sill part 6, without requiring particular structural features in order for the side sill part 6 to behave as wished during a side impact.

The method for producing the above described side sill part 6, will now be described.

As described previously, the inner and outer sill members 10 and 12 are for example each obtained by hot stamping a tailor welded steel blank and the first, second and external profile parts 48, 88 and 68 are each obtained by roll forming a steel sheet or a steel coil.

Before assembling the inner sill member 12 with the outer sill member 10, the first profile part 48 is attached to the outer sill member 10, for example by spot welding the upper contact portion 56 of the first profile part 48 to the inner contact surface 16 of the outer sill member 10 and the lower contact portion 60 of the first profile part 48 to the inner contact surface 16 of the outer sill member 10.

Also before assembling the inner sill member 12 with the outer sill member 10, the second profile part 88 is attached to the inner sill member 12, for example by spot welding the upper outer contact portion 96 of the second profile part 88 to the inner contact surface 30 of the inner sill member 12, the lower outer contact portion 110 of the second profile part 88 to the inner contact surface 30 of the inner sill member 12 and the central outer contact portion 102 of the second profile part 88 to the inner contact surface 30 of the inner sill member 12. Once the second profile part 88 is attached to the inner sill member 12, the external profile part 68 is attached to the inner sill member 12, for example by spot welding the upper portion of the external profile part 68 to the upper inner contact surface 34 of the inner sill member 12 and the lower portion of the external profile part 68 to the lower inner contact surface 42 of the inner sill member 12.

The inner sill member 12, to which the second profile part 88 and the external profile part 68 are attached, is then attached to the outer sill member 10, to which the first profile part 48 is attached, for example by spot welding the upper inner contact surface 18 of the outer sill member 10 to the upper outer contact surface 32 of the inner sill member 12 and the lower inner contact surface 22 of the outer sill member 10 to the lower outer contact surface 44 of the inner sill member 12.

According to an embodiment, the external profile part 68 is first attached to the transversal beam 4 and to the rest of the vehicle underbody structure, which will now be described, before being attached to the inner sill member 12, to which the second profile part 88 is attached.

As indicated previously, the transversal beam 4 is a substantially undeformable part during a side impact. To this end, the transversal beam 4 is made of a rigid material, such as a press-hardened steel part having a tensile strength greater than 1200 MPa. According to an embodiment, the transversal beam 4 is made of Usibor®1500.

The transversal beam 4 extends between two transversal ends 116, each being applied against one side sill part 6 as described above. More particularly, as shown in FIG. 2, one of the transversal ends 116 is applied against a part of the inner contact surface 72 of the external profile part 68 of the right side sill part 6 and the other transversal end (not shown) is applied against a part of the inner contact surface of the external profile part of the left side sill part (not shown). The vehicle underbody structure may comprise more than one transversal beam 4 extending between the two side sill parts 6.

According to an embodiment wherein the automotive vehicle is more particularly an electrical automotive vehicle powered by a battery pack 118, the vehicle underbody further comprises this battery pack 118. As known per se, the battery pack 118 comprises at least one battery cell 120 and a protecting frame 122.

As shown in FIG. 2, the battery pack 118 extends below the transversal beam 4 between the side sill parts 6. The protecting frame 122 comprises at least two longitudinal reinforcing profiles 124, each extending opposite one of the side sill part 6, in the vicinity thereof. The reinforcing profiles 124 being substantially identical and symmetrical one relative to the other relative to a central plane of the vehicle extending in the longitudinal and elevation directions, only one reinforcing profile 124 will be described in detail herein.

The reinforcing profile 124 extends opposite, and in the vicinity of, a part of the inner contact surface 72 of the external profile part 68, below the part of the inner contact surface 72 against which the transversal beam 4 is attached.

The reinforcing profile 124 has an 8-shaped cross-section and comprises an upper portion 126 and a lower portion 128 extending in the longitudinal direction, the upper portion 126 and the lower portion 128 each having a closed cross-section defined by a front wall 130, a rear wall 132, an upper wall 134 and a lower wall 136. The upper wall 134 and the lower wall 136 join the front wall 130 to the rear wall 132. A central wall 138 extends between the front walls 130 and the rear walls 132 of the upper portion 126 and of the lower portion 128 and forms both the lower wall of the upper portion 126 and the upper wall of the lower portion 128.

The front walls 130 extend opposite the inner contact surface 72 of the external profile part 68 and by "the reinforcing profile 124 extends in the vicinity of the inner contact surface 72 of the external part 68", it is meant that the distance between the front walls 130 and the inner contact surface 72 is substantially comprised between 1 mm and 5 mm.

The front walls 130 and the rear walls 132 are substantially parallel to the inner contact surface 72 of the external part 68 and the upper walls 134 and the lower walls 136 are substantially perpendicular to the front walls 130 and to the rear walls 132. In other words, the upper walls 134 and the lower walls 136 extend substantially along the longitudinal and transversal directions L and T. According the embodiment shown in FIG. 2, the central wall 138, however, is slightly inclined relative to the transversal direction T.

The reinforcing profile 124 is for example made of at least one roll formed steel sheet, which is bent and closed on itself to define the above 8-shaped cross-section. The material and the shape of the reinforcing profile 124 are arranged such that the reinforcing profile 124 remains substantially undeformed in the case of a side impact.

The reinforcing profile 124 is for example attached to the external profile part 68 by a connecting part 140 extending between the reinforcing profile 124 and the external profile part 68. The connecting part 140 is for example formed by a L-shaped profile attached to the front walls 130 of the reinforcing profile 124 by its vertical wall and attached to the lower joining wall 84 of the external profile part 68 by its horizontal wall. More particularly, the connecting part 140 is for example received against the part of the lower joining wall 84 adjacent to the central portion of the external profile part 68 and against the step 86 formed in the lower joining wall 84. The arrangement of the connecting part 140 between the front walls 130 of the reinforcing profile 124 and the external profile part 68 is such that the protecting frame 122 can be attached to the side sill part 6 while keeping a sufficient clearance between the bottom of the battery pack 118 and the ground on which the vehicle circulates.

The behavior of the vehicle underbody structure 2 as described above in the case of a side impact will now be described in reference to FIGS. 4 and 5.

A described previously, a side impact can be simulated via various standardized crash tests such as for example the European New Car Assessment Program (EuroNCAP) Pole Side Impact, in which the vehicle is impacted on its side by a fixed pole having a relative initial velocity at the time of impact of 32 km/h. Another standardized side impact test is the EuroNCAP Advanced European Mobile Deformable Barrier (AE-MDB) Side Impact, in which the vehicle is impacted on its side by a 1300 kg standardized barrier spanning part of the length travelling at a speed of 50 km/h.

In case of a side impact, a pole 142 impacts one of the sides of the vehicle and exerts a force oriented toward the interior of the vehicle according to the transversal direction T.

Figure 4:
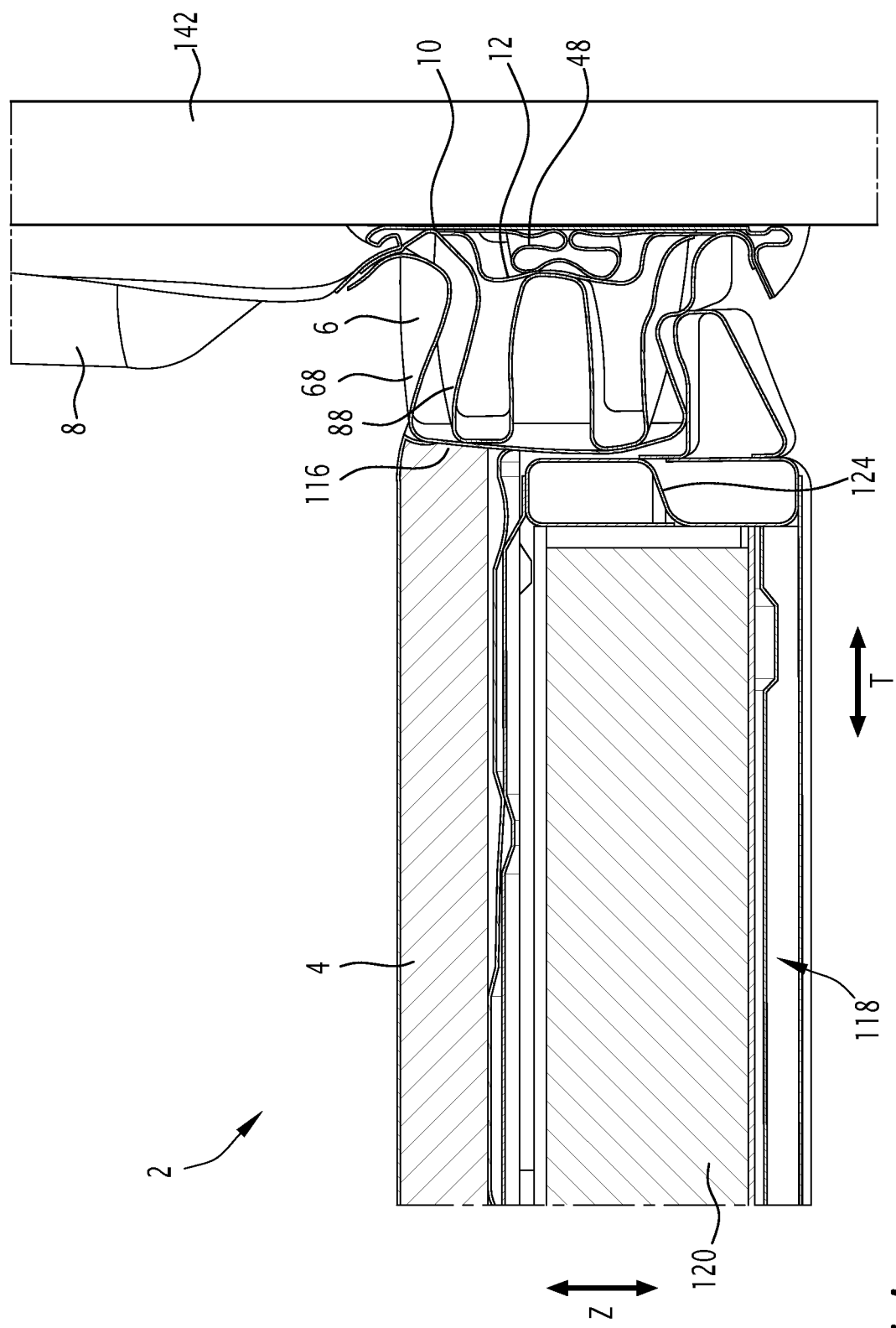
FIGS. 4 and 5 are transversal cross-section views of the vehicle underbody structure of FIG. 2 during a side impact.
Figure 5:
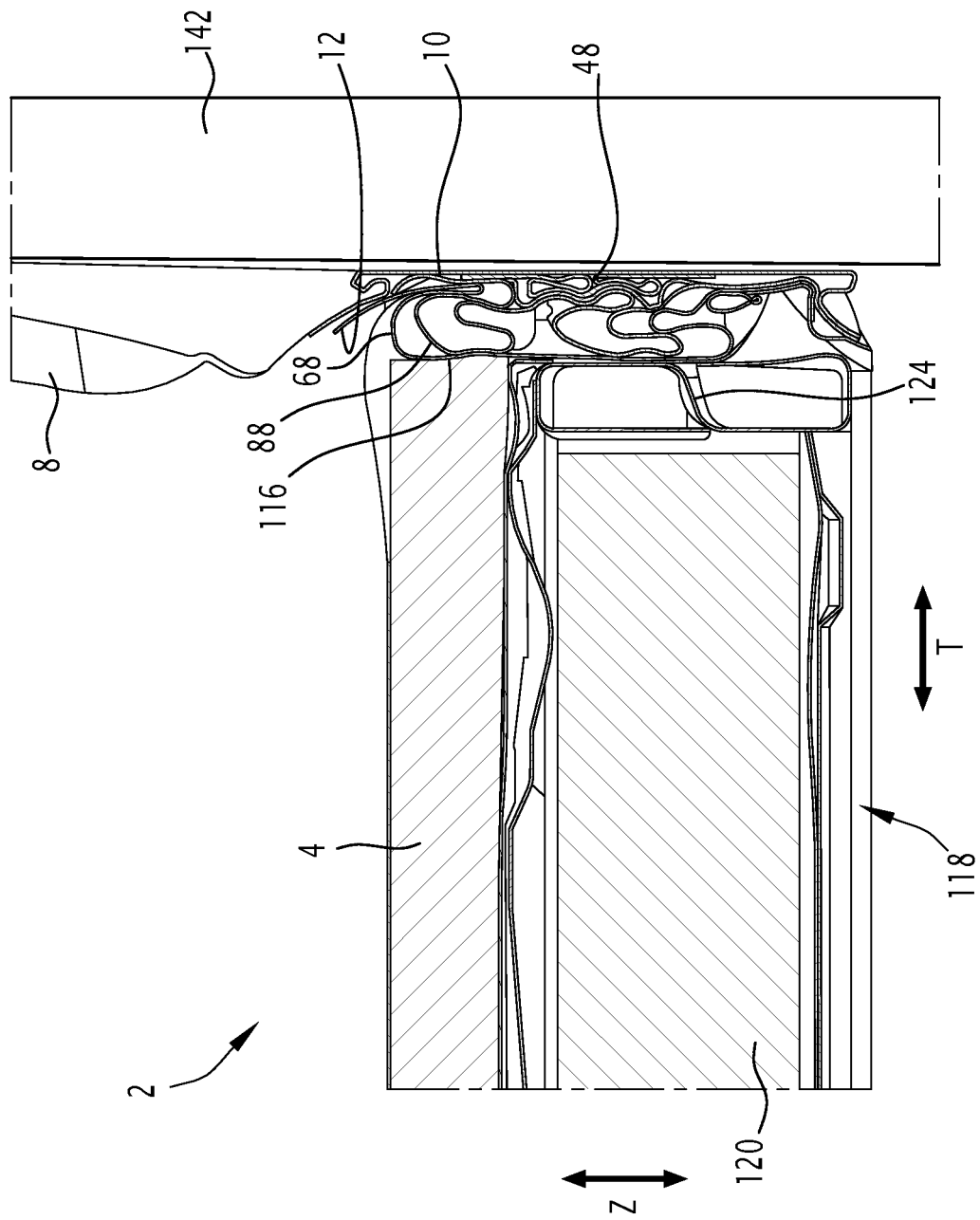

When the pole 142 impacts the outer sill member 10, the outer sill member 10 crushes the first profile part 48 against the outer contact surface 28 of the inner sill member 12 by folding the joining walls 58 and 62 of the first profile part 48 between the outer contact portion 50 and the inner contact portion 52, as shown in FIG. 4. The folding of the joining walls 58 and 62 allows absorbing part of the energy due to the side impact. Furthermore, thanks to the hat-shaped cross-sections of the outer sill member 10 and of the inner sill member 12, the dimension of the outer volume 47 can be increased, which allows increasing the width of the joining walls 58 and 62 in the transversal direction T, thereby improving the energy absorption obtained during the folding of the joining walls 58 and 62. It should be noted that the step(s) 64 formed in the joining wall(s) 58 and/or 62 act as guiding means of the folding of the joining wall(s) and allows optimizing the energy absorption of the joining wall(s) by ensuring a satisfactory folding pattern of the joining wall(s).

Since the crushability of the first profile part 48 is greater than the crushability of the outer sill member 10 and of the inner sill member 12, it is ensured that the first profile part 48 is fully crushed before the inner volume 74 is crushed as the side impact spreads towards the transversal beam 4.

Once the first profile part 48 is crushed, the outer sill member 10, which is also crushed against the inner sill member 12, and the inner sill member 12 act on the second profile part 88, which gets crushed against the outer contact surface 70 of the external profile part 68, thanks to the differences in the crushabilities of the various components of the side sill part 6, as described previously. It should be noted that the recess formed in the central portion of the outer sill member 10, when present, and the recess 66 formed in the central portion of the first profile part 48 also act as a guiding means for the deformation of the outer sill member 10, which also absorb energy when being crushed, and of the first profile part 48.

When the second profile part 88 is crushed, the joining wall(s) 94 is crushed between outer contact portion 90 and the inner contact portion 92. More particularly, the upper, first and second intermediate and lower joining walls 100, 104, 108 and 112 are folded on themselves thereby absorbing energy. As for the first profile part 48, the step(s) 114 formed in the joining wall(s) act as guiding means for the folding of the joining wall(s) thereby improving the energy absorption. Thanks to the hat-shape of the inner sill member 12 and of the W-shape of the second profile part 88, the width of the upper and lower joining walls 100 and 112 can be increased relative to the width of the first and second intermediate joining walls 104 and 108, thereby also optimizing the energy absorption capacity of the second profile part 88.

Since the external profile part 68 extends against at least one transversal beam 4 which is substantially undeformable during the side impact, the external profile part 68 also get crushed against the transversal beam(s) 4 as the side impact spreads towards the interior of the vehicle. Since the crushability of the second profile part 88 is greater than the crushability of the external profile part 68, it is however insured that the second profile part 88 gets fully crushed before the external profile part 68 also gets fully crushed, thereby optimizing the energy absorption of the side sill part 6, as shown in FIG. 5.

The connecting part 140 can also be arranged to absorb energy during the crushing of the external profile part 68. This energy absorption occurs through the crushing of the connecting part 140 against the reinforcing profile 124 of the protecting frame 122 which remains substantially undeformed during the side impact, as described previously and as shown in FIG. 5.

Thanks to the different crushabilities of the components of the side sill part 6, an optimized deformation or crushing sequence occurs during the side impact thereby optimizing the energy absorption capacity of the side sill part 6. As mentioned previously, this crushing sequence substantially comprises a full crushing of the outer volume 47, as shown in FIG. 4, before a full crushing of the inner volume 74, as shown in FIG. 5.

When the side sill part 6 is fully crushed, the intrusion in the vehicle compartment of the pole 142 is prevented thanks to the transversal beam(s) 4. Furthermore, damages to the battery cell(s) 120 are also prevented thanks to the reinforcing profiles 124 of the protecting frame 122.

It is to be understood that the shapes of the first profile part 48 and of the second profile part 88 are given by way of example and that they could be modified, in particular in order to increase the number of joining walls extending through the outer and inner volumes to further improve the energy absorption during a side impact.

What is claimed is:

1. A side sill part for an automotive vehicle, extending along a substantially longitudinal direction, comprising:
    an outer sill member and an inner sill member, made of a substantially rigid material, and defining between them an outer volume, the outer sill member comprising at least one inner contact surface and the inner sill member comprising at least one outer contact surface, at least a part of the outer contact surface of the inner sill member being spaced from at least a part of the inner contact surface of the outer sill member according to a transversal direction substantially perpendicular to the longitudinal direction;
    an external profile part, defining with the inner sill member an inner volume, the external profile part comprising an outer contact surface at least in part spaced from an inner contact surface of the inner sill member according to the transversal direction;
    a first profile part extending in the outer volume, the first profile part comprising at least one outer contact portion, applied against the inner contact surface of the outer sill member, at least one inner contact portion, extending opposite the outer contact surface of the inner sill member, and at least one joining wall joining the outer contact portion and the inner contact portion along the transversal direction, the first profile part presenting a first crushability in the transversal direction; and
    a second profile part extending in the inner volume, the second profile part comprising at least one outer contact portion, applied against the inner contact surface of the inner sill member, at least one inner contact portion, extending opposite the outer contact surface of the external profile part, and at least one joining wall joining the outer contact portion and the inner contact portion along the transversal direction, the second profile part presenting a second crushability in the transversal direction inferior to the first crushability,
    wherein the external profile part presents a third crushability in the transversal direction inferior to the second crushability.

2. The side sill part according to claim 1, wherein the first profile part comprises:
    at least one upper outer contact portion applied against the inner contact surface of the outer sill member;
    at least one upper joining wall joining the upper outer contact portion to the inner contact portion;
    at least one lower outer contact portion applied against the inner contact surface of the outer sill member; and
    at least one lower joining wall joining the lower outer contact portion to the inner contact portion.

3. The side sill part according to claim 2, wherein the upper outer contact portion and the lower outer contact portion of the first profile part are attached to the inner contact surface of the outer sill member.

4. The side sill part according to claim 1, wherein the second profile part comprises:
    at least one upper outer contact portion applied against the inner contact surface of the inner sill member;
    at least one upper inner contact portion extending opposite the outer contact surface of the external profile part;
    at least one upper joining wall joining the upper outer contact portion to the upper inner contact portion;
    at least one outer central contact portion applied against the inner contact surface of the inner sill member;

at least one first intermediate joining wall joining the upper inner contact portion to the outer central contact portion;

at least one inner lower contact portion extending opposite the outer contact surface of the external profile part;

at least one second intermediate joining wall joining the outer central contact portion to the inner lower contact portion;

at least one lower outer contact portion applied against the inner contact surface of the inner sill member; and at least one lower joining wall joining the inner lower contact portion to the outer lower contact portion.

5. The side sill part according to claim 4, wherein the upper outer contact portion and the lower outer contact portion of the second profile part are attached to the inner contact surface of the inner sill member.

6. The side sill part according to claim 4, wherein the outer central contact portion of the second profile part is attached to the inner contact surface of the inner sill member.

7. The side sill part according to claim 1, wherein the outer sill member comprises:

at least one upper inner contact surface applied against the outer contact surface of the inner sill member;

at least one central inner contact surface spaced from the outer contact surface of the inner sill member;

at least one upper joining wall joining the upper inner contact surface to the central inner contact surface of the outer sill member;

at least one lower inner contact surface applied against the outer contact surface of the inner sill member; and at least one lower joining wall joining the lower inner contact surface to the central inner contact surface of the outer sill member, wherein the outer volume is delimited by the central inner contact surface of the outer sill member, by the outer contact surface of the inner sill member and by the upper joining wall and the lower joining wall of the outer sill member.

8. The side sill part according to claim 7, wherein the upper inner contact surface and the lower inner contact surface of the outer sill member are attached to the outer contact surface of the inner sill member.

9. The side sill part according to claim 1, wherein the external profile part comprises:

at least one upper outer contact surface applied against the inner contact surface of the inner sill member;

at least one central outer contact surface spaced from the inner contact surface of the inner sill member;

at least one upper joining wall joining the upper outer contact surface to the central outer contact surface of the external profile part;

at least one lower outer contact surface applied against the inner contact surface of the inner sill member; and at least one lower joining wall joining the lower outer contact surface to the central outer contact surface of the external profile part, wherein the inner volume is delimited by the central outer contact surface of the external profile part, by the inner contact surface of the inner sill member and by the upper joining wall and the lower joining wall of the external profile part.

10. The side sill part according to claim 9, wherein the upper outer contact surface and the lower outer contact surface of the external profile part are attached to the inner contact surface of the inner sill member.

11. The side sill part according to claim 1, wherein the inner sill member comprises at least one central portion and one upper portion and one lower portion extending on either side of the central portion, a distance between the outer contact surface of the inner sill member in the central portion and the inner contact surface of the outer sill member being greater than a distance between the outer contact surface of the inner sill member in the upper and lower portions and the inner contact surface of the outer sill member.

12. The side sill part according to claim 1, wherein the outer sill member and the inner sill member are made of a press-hardened steel part having a tensile strength greater than 1200 MPa.

13. The side sill part according to claim 12, wherein the composition of the press-hardened steel comprises in % weight:

$0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration; or $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, a remainder being iron and unavoidable impurities resulting from the elaboration; or $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, %, the remainder being iron and unavoidable impurities resulting from the elaboration.

14. The side sill part according to claim 1, wherein a thickness of the outer sill member is substantially comprised between 1.2 mm and 1.6 mm.

15. The side sill part according to claim 1, wherein a thickness of the inner sill member is substantially comprised between 0.8 mm and 1.2 mm.

16. The side sill part according to claim 1, wherein the external profile part, the first profile part and the second profile part are made of a fully martensitic steel having a yield strength comprised between 1200 MPa and 1700 MPa and a tensile strength comprised between 1500 MPa and 1900 MPa.

17. The side sill part according to claim 16, wherein the composition of the fully martensitic steel comprises in % weight $0.15\% \leq C \leq 0.5\%$.

18. The side sill part according to claim 1, wherein a product of a yield strength by a thickness of the external profile part is greater than a product of a yield strength by a thickness of the second profile part, a product of the yield strength by a thickness of the second profile part being greater than a product of a yield strength by a thickness of the first profile part.

19. The side sill part according to claim 1, wherein a thickness of the external profile part is greater than a thickness of the second profile part, a thickness of the second profile part being greater than a thickness of the first profile part.

20. The side sill part according to claim 1, wherein a thickness of the first profile part is substantially comprised between 0.8 mm and 1.2 mm.

21. The side sill part according to claim 1, wherein a thickness of the second profile part is substantially comprised between 1.2 mm and 1.6 mm.

22. The side sill part according to claim 1, wherein a thickness of the external profile part is substantially comprised between 1.6 mm and 2 mm.

23. The side sill part according to claim 1, wherein at least one of the joining walls of the first profile part and/or of the second profile part extends in at least two different planes.

24. A vehicle underbody structure for an automotive vehicle comprising:
- two of the side sill part according to claim 1; and
- at least one transversal beam made of a substantially rigid material, extending in a transversal direction between the two side sill parts, a part of an inner contact surface of the external profile part of one of the side sill parts being applied against one of the transversal ends of the transversal beam and a part of the inner contact surface of the external profile part of the other side sill part being applied against the other transversal end of the transversal beam.

25. The vehicle underbody structure according to claim 24, further comprising at least one battery pack protecting frame extending below the transversal beam between the two side sill parts, the battery pack protecting frame comprising at least two longitudinal reinforcing profiles, one of the reinforcing profiles extending opposite a part of the inner contact surface of the external profile part of one of the side sill parts and the other reinforcing profile extending opposite a part of the inner contact surface of the external profile part of the other side sill part.

26. The vehicle underbody structure according to claim 25, wherein each of the reinforcing profiles is attached to the external profile part of the corresponding side sill part via a connecting part extending between said reinforcing profile and said external profile part of the corresponding side sill part.

27. The vehicle underbody structure according to claim 25, wherein each of the reinforcing profiles is made of at least one roll formed steel sheet comprising an upper portion and a lower portion extending in the longitudinal direction, said upper portion and said lower portion each having a closed cross-section defined by a front wall, a rear wall, an upper wall and a lower wall, the upper wall and the lower wall joining the front wall to the rear wall, wherein a central wall extending between the front walls and the rear walls of the upper portion and of the lower portion forms both the lower wall of the upper portion and the upper wall of the lower portion.

28. The vehicle underbody structure according to claim 25, wherein at least one battery cell for an electrical vehicle is received in the battery pack protecting frame.

\* \* \* \* \*